United States Patent [19]

Hori et al.

[11] Patent Number: 5,276,714
[45] Date of Patent: Jan. 4, 1994

[54] BROADCAST/NON-BROADCAST MUSE SIGNAL SOUND DECODER WITH A VARIABLE PROTECTION PERIOD

[75] Inventors: Yoshihiro Hori; Kazuo Naganawa; Yoshikazu Asano; Yosuke Mizutani; Shuji Yanase, all of Gifu, Japan

[73] Assignee: Sanyo Electric Co., Ltd., Osaka, Japan

[21] Appl. No.: 823,162

[22] Filed: Jan. 21, 1992

[30] Foreign Application Priority Data

Jan. 29, 1991 [JP] Japan ................................. 3-9320

[51] Int. Cl.5 ............................................... H04L 7/00
[52] U.S. Cl. ...................................... 375/116; 375/104; 358/165; 381/34; 370/109
[58] Field of Search ............... 375/122, 104, 114, 116; 370/105.1, 105.4, 105.5, 109; 358/145, 165; 340/825.06, 825.14; 381/34; 405/210, 221, 222; 360/19.1, 38.1; H04N 7/00, 7/087

[56] References Cited

U.S. PATENT DOCUMENTS

| | | |
|---|---|---|
| 4,403,262 | 9/1983 | Ito et al. ........................ 360/19.1 |
| 4,467,473 | 8/1984 | Arnon et al. .................. 370/105.1 |
| 4,620,300 | 10/1986 | Ogawa .............................. 375/106 |
| 4,637,016 | 1/1987 | Ciancibello et al. .......... 370/105.1 |
| 4,748,623 | 5/1988 | Fujimoto ....................... 370/105.1 |
| 5,148,276 | 9/1992 | Furumiya et al. ................ 358/153 |

Primary Examiner—Curtis Kuntz
Assistant Examiner—T. Ghebretinsae
Attorney, Agent, or Firm—Peter L. Michaelson; Raymond R. Moser, Jr.

[57] ABSTRACT

A MUSE sound decoder detects a broadcasting/non-broadcasting identification flag included in the control signals in an applied MUSE signal to determine whether the MUSE signal is broadcasted or non-broadcasted. The MUSE sound decoder further includes a frame synchronization protection circuit for protecting frame synchronization over a predetermined frame synchronization protection time period when the frame synchronization pattern is not detected at the proper timing. The frame synchronization protection circuit sets the frame synchronization protection time period to a long time period when the MUSE signal is determined to be a broadcasted MUSE signal, and to a short time period when the MUSE signal is determined to be a non-broadcasted MUSE signal. Appropriate muting of a sound signal can be carried out according to the condition of the received MUSE signal.

7 Claims, 13 Drawing Sheets

FIG.7

|  | SAMPLING POINT No. | | | | | |
|---|---|---|---|---|---|---|
| | 12  20 | | | | | 99 106 |
| 559 (1121) | GUARD AREA | 1 | 2 | 3 | 4 | 5 | GUARD AREA |
| 560 (1122) | | 6 | 7 | 8 | 1 | 2 | |
| 561 (1123) | | 3 | 4 | 5 | 6 | 7 | |
| 562 (1124) | | 8 | 1 | 2 | 3 | 4 | |
| 563 (1125) | | 5 | 6 | 7 | 8 | E | |

LINE No.

FIG. 8

| BIT No. | CONTENTS OF CONTROL | |
|---|---|---|
| 1 | INTERFIELD SAMPLING PHASE (Y) | "1" WHEN SAMPLING POINT IS AT RIGHT |
| 2<br>3<br>4<br>5 | HORIZONTAL MOTION VECTOR (2')<br>#2, LSB<br>1 CK UNIT OF 32MHz | "POSITIVE" WHEN PICTURE MOVES TO RIGHT |
| 6<br>7<br>8 | VERTICAL MOTION VECTOR (2')<br>#6, LSB<br>LINE UNIT | "POSITIVE" WHEN PICTURE MOVES DOWN |
| 9 | Y SAMPLING PHASE | "1" WHEN SAMPLING POINT IS AT RIGHT ON ODD NUMBER LINE |
| 10 | C SUB-SAMPLING PHASE | "1" WHEN LINE No./2 IS ODD NUMBER AND SAMPLING POINT IS AT LEFT |
| 11<br>12 | USE NOISE REDUCE OF HIGHER DEGREE IN THE ORDER OF NOISE REDUCE CONTROL VALUE | |
| 13 | ITERATION FLAG | |
| 14 | MOTION DETECTION SENSITIVITY CONTROL (1) | SELECT LOW SENSITIVITY WHEN IT IS "1" |
| 15 | MOTION DETECTION SENSITIVITY CONTROL (2) | |
| 16<br>17<br>18 | MOTION INFORMATION | 0: NORMAL<br>1: COMPLETE STILL PICTURE   2: SEMI-STILL PICTURE<br>3~7: INDICATE DEGREE OF MOTION |
| 19 | DETERMINATION OF BROADCASTING/NON-BROADCASTING | 0: NON-BROADCASTING   1: BROADCASTING |
| 20 | AM/FM "1" INDICATES AM WITHOUT EMPHASIS | |
| 21<br>≀<br>32 | SPARE | |

BROADCAST/NON-BROADCAST MUSE SIGNAL SOUND DECODER WITH A VARIABLE PROTECTION PERIOD

BACKGROUND OF THE INVENTION

1. Field of the Invention

The present invention relates to sound decoders, and more particularly, to a sound decoder for decoding, for example, a MUSE sound signal of NI-DPCM (Nearly-Instantaneous Differential Pulse Code Modulation) format that is multiplexed in a high definition television signal of MUSE (Multiple Sub-Nyquist Sampling Encoding) system format.

2. Description of the Background Art

In a high definition television signal of MUSE system (referred to as a MUSE signal hereinafter) proposed by Nippon Hoso Kyokai (NHK), a MUSE sound signal of NI-DPCM format (referred to as an NI-DPCM sound signal hereinafter) is multiplexed within the vertical blanking period of a MUSE video signal. Therefore, a MUSE sound decoder is required for extracting and decoding the NI-DPCM sound signal from the MUSE signal in receiving and reproducing such MUSE signals.

A typical MUSE signal television receiver generally contains a MUSE sound decoder for extracting and decoding a NI-DPCM sound signal that is multiplexed in a MUSE signal transmitted via a broadcasting satellite and received by an antenna and a baseband signal (BS) tuner, or an externally supplied MUSE signal reproduced from a recording medium by a reproduction equipment such as a MUSE disk player or a MUSE-VCR. Such a MUSE sound decoder is incorporated not only in MUSE signal television receivers, but also in various video equipments that process MUSE signals, and is also used as a unit in various environments wherein MUSE signals are processed. Such a MUSE sound decoder is disclosed in, for example, Japanese Patent Laying-Open No. 2-11076.

Prior to the description of a MUSE sound decoder, the principle of forming an NI-DPCM sound signal to be multiplexed in a transmission MUSE signal will be described schematically. The formation of such an NI-DPCM sound signal is described in detail in IEEE TRANSACTIONS ON BROADCASTING December 1987, Volume BC-33, No. 4, pp. 188-196 "Sound Transmission for HDTV Using Baseband Multiplexing into MUSE Video Signal" by T. Takegahara et al.

FIG. 1 is a schematic block diagram of a typical structure of a MUSE sound encoder for forming an NI-DPCM sound signal. Referring to FIG. 1, an analog sound signal supplied from a sound signal source (not shown) via an input terminal 1 is converted into a digital sound signal by an A-D converter 2 (A-mode sound data: sampling frequency 32 kHz, number of quantizing bits 15 bits/B-mode sound data: sampling frequency 48 kHz, number of quantizing bits 16 bits). This digital sound signal is provided to an NI-DPCM encoder 3 where the A-mode sound data of 15 bits and the B mode sound data of 16 bits are compressed to differential data of 8 bits (8 ranges) and 11 bits (6 ranges), respectively. The details of NI-DPCM encoding is described in the above mentioned document, and will not be described here.

The NI-DPCM sound signal provided from NI-DPCM encoder 3 is word-interleaved in the sample word direction in a word interleave circuit 4 to be supplied to one input of an adder 5. An error correction code generated from an error correction code generating circuit 6 is supplied to the other input of adder 5 to be multiplexed into the NI-DPCM sound signal. Following a BCH error correction process by a BCH error correction circuit 7, the signal is bit-interleaved by a bit interleave circuit 8. The above mentioned interleave and error correction processes are described in the aforementioned document, and will not be described here. The bit-interleaved NI-DPCM sound signal is supplied to one input of an adder 9. A frame synchronizing signal having a predetermined bit pattern of 16 bits and a control code of 22 bits from a signal generating circuit 10 is applied to the other input of adder 9 to be multiplexed into the NI-DPCM sound signal. As a result, a sound data bit stream of 1.35 Mbit/seconds is provided at a frame frequency of 1 kHz from adder 9.

FIG. 2 shows the bit arrangement of 1 frame (1350 bits) in A-mode, for example. FIG. 3 shows the bit allocation on a bit interleave matrix. The head frame synchronizing signal of each frame shown in FIGS. 2 and 3 has a fixed bit pattern of 16 bits of "0001001101011110".

As shown in FIG. 1, the NI-DPCM sound signal of 1.35 Mbit/sec provided from adder 9 is frame-interleaved in an inter-frame interleave circuit 11 to be provided to a binary to ternary conversion circuit 12, where the signal is converted into data of ternary format. The ternary data provided from binary to ternary conversion circuit 12 is converted into ternary data having sampling rate of 12.15 MHz in a time compression circuit 13 to be provided to a sampling frequency conversion circuit 14. The NI-DPCM signal has the sampling rate converted from 12.15 MHz to 16.2 MHz in sampling frequency conversion circuit 14 to be supplied to one input of an adder 15. The other input of adder 15 is supplied with a digital MUSE video signal having sampling rate of 16.2 MHz from a video signal source (not shown), whereby the above-described NI-DPCM sound signal is multiplexed within the vertical blanking period thereof. As a result, a MUSE signal of 16.2 MHz is provided from adder 15 to be output via a terminal 16. Thus, a MUSE signal provided from a MUSE encoder is converted into an analog signal to be transmitted by a broadcasting radio wave, or to be recorded on a recording medium such as an optical disk or a magnetic tape.

FIG. 4 is a block diagram showing a structure of a conventional MUSE sound decoder for decoding a sound signal from a MUSE signal that is formed in the above-described manner.

Referring to FIG. 4, an analog MUSE signal received via a broadcasting satellite or reproduced from a recording medium by a reproduction equipment is supplied to an input terminal 21. The analog MUSE signal is then converted into a digital signal by an A-D converter 22 to be provided to a sound signal gate 23. The NI-DPCM signal multiplexed in the vertical blanking period of the MUSE signal is separated by sound signal gate 23 to be provided to a sampling frequency conversion circuit 24.

The NI-DPCM signal of ternary format has the sampling rate converted from 16.2 MHz to 12.15 MHz by sampling frequency conversion circuit 24 to be provided to a ternary to binary conversion circuit 25. The ternary signal of 12.15 MHz is converted into a binary signal by ternary to binary conversion circuit 25 to be provided to a time expansion circuit 26.

The binary signal is converted into a baseband signal of 1.35 Mbit/sec by time expansion circuit 26 to be provided to an interframe de-interleave circuit 27. Since the provided signal is interframe-interleaved by the aforementioned inter-frame interleave circuit 11 (FIG. 1), this signal is de-interleaved by interframe de-interleave circuit 27 to have the proper frame order. Then, the signal is provided to a bit de-interleave circuit 28 and a frame synchronization detection circuit 34.

Since the NI-DPCM signal provided to bit de-interleave circuit 28 is bit-interleaved by the aforementioned bit interleave circuit 8 (FIG. 1), this signal is bit de-interleaved so as to be restored to a signal arranged in the sample word direction. The bit de-interleaved NI-DPCM sound signal, produced by circuit 28, provided to an error correction circuit 29, where error correction is carried out according to a BCH code. Then, the signal is provided to a word de-interleave circuit 30. Since this signal is interleaved in the sample word direction by the aforementioned word interleave circuit. 4 (FIG. 1), this word interleaved signal applied to circuit 30 is word de-interleaved so as to remove the interleave of the sample word direction thus restoring the word interleaved signal to a signal with the original one frame.

The output of word de-interleave circuit 30 is provided to an NI-DPCM decoder 31 to be restored to a digital sound signal. The principle of decoding by an NI-DPCM decoder is described in detail in the aforementioned document. The digital sound signal provided from NI-DPCM decoder 31 is converted into an analog signal by a D-A converter 32, and from there, provided to an output terminal 37, via a mute circuit 33.

The output of interframe de-interleave circuit 27 is also provided to a frame synchronization detection circuit 34 to detect a frame synchronizing pattern of 16 bits for each frame of the NI-DPCM sound signal. In other words, if the 16 head bits of the NI-DPCM sound signal of each frame is determined, by frame synchronization circuit 34, to exactly possess a bit pattern of "0001001101011110," a frame synchronization detection flag is generated and provided to a frame synchronization protection circuit 35.

In an abnormal case where frame synchronization detection circuit 34 determines that the frame synchronization pattern is temporarily missing, or w an erroneous detection is made over a short period, frame synchronization protection circuit 35 protects the frame synchronization by generating an internal frame signal of the proper frame frequency over a predetermined frame synchronization protection time period. If the above described abnormal state still remains even after the lapse of the aforementioned predetermined frame synchronization protection time period, frame synchronization protection circuit 35 provides a mute signal to a mute circuit 33 to mute the analog sound signal provided from D-A converter 32. The mute of the output sound signal is canceled by the proper detection of a frame synchronizing pattern by frame synchronization detection circuit 34. Various timing signals used in the decoder are generated even during the above described abnormal state from a timing signal generating circuit 36 according to an internal frame signal provided from frame synchronization protection circuit 35.

When a MUSE signal is transmitted as a broadcasting radio wave, the signal to noise (S-N) ratio is often degraded due to an influence of an external environment, such as the weather. Although error corrections by BCH codes and various interleaves are possible for the transmitted sound data, per se, as described in association with FIG. 1, there is no error correction provided for the frame synchronizing pattern of 16 bits located at the head of each frame data. Therefore, there may be partial portions missing from the frame synchronization pattern, having a bit length of 16 bits, due to degradation of S-N ratio. Because frame synchronization detection circuit 34 of the MUSE sound decoder generates a frame synchronization detection flag only when a complete frame synchronizing pattern of 16 bits is received, and does not generate a frame synchronization detection flag even if one bit is missing, there will be cases where the frame synchronization is frequently not detected in the case of degradation of S-N ratio due to aggravation of the radio wave by the weather. If the predetermined frame synchronization protection time period for the generation of the aforementioned mute signal is reduced, and set to a time period of 5 frames, for example, the mute will be applied frequently at a short cycle and even for sufficiently audible output sound signals which include some noise due to S-N ratio degradation, thereby resulting in disagreeable sound.

If the frame synchronization protection time period is lengthened, for example to 64 frames, for the purpose of suppressing frequent mute of such sound output, a problem is encountered that will be described hereinafter. A reproduced MUSE signal, provided from a reproduction equipment such as a MUSE disk player or a MUSE-VCR, has a constant S-N ratio, so that the abnormal state of not detecting frame synchronization owing to continuous S-N ratio degradation in a broadcasting radio wave is unlikely to occur. However, dropout easily occurs in the reproduced MUSE signal due to variation in the mechanical system of the reproduction equipment. Also, sound data as well as the synchronizing signal of a MUSE video signal may be missing completely over several frames at the time-of special reproduction or halt. In these cases, a significant amount of noise is generated. Although dropout of a relatively short time period can be compensated, owing to various error correction processes applied to the NI-DPCM sound signal, as described above, dropout over a long time period can not be compensated. It is effective to apply mute to sound output for such a missing signal. However, a long frame synchronization protection time period (for example, a time period of 64 frames) results in the generation of a substantial amount of noise since muting of the sound output is not immediately effective when dropout occurs in a sound signal.

SUMMARY OF THE INVENTION

In view of the foregoing, an object of the present invention is to provide a sound decoder that allows appropriate muting of sound output in the case of receiving any broadcasting signal or a non-broadcasting signal.

Another object of the present invention is to provide a sound decoder that can prevent the situation of frequent muting of a sound signal even when the signal has a degraded S-N ratio.

A further object of the present invention is to provide a sound decoder that can prevent generation of noise in a reproduced sound signal even when a reproduced signal is received having sound data completely missing over a short time period due to a dropout and special reproduction.

A sound decoder according to the present invention includes a circuit for extracting and decoding a sound signal including a frame synchronizing pattern from the supplied broadcasting or non-broadcasting signal, a circuit for detecting a frame synchronizing pattern in the MUSE sound signal, a circuit for carrying out protection of frame synchronization over a predetermined frame synchronization protection time period when the frame synchronizing signal is not detected at the proper timing, a circuit for making a determination whether the supplied signal is a broadcasting signal or a non-broadcasting signal and a circuit for changing the length of the frame synchronization protection time period according to the determination result.

According to another aspect of the present invention, a long frame synchronization protection time period is set when the determination is made that the supplied signal is broadcast, and a short frame synchronization protection time period is set when the determination is made that the provided signal is non-broadcast.

According to a further aspect of the present invention, the sound decoder further includes a circuit for muting a sound signal when the detection of a frame synchronizing pattern is not restored to the proper timing within the frame synchronization protection time period.

According to still another aspect of the present invention, the determination circuit makes the determination of a broadcasting signal or a non-broadcasting signal according to a broadcasting/non-broadcasting identification signal included in control codes in a signal.

According to a still further aspect of the present invention, the sound decoder includes a circuit for extracting and decoding a MUSE sound signal, a circuit for detecting a frame synchronizing pattern in the sound signal, a circuit for carrying out protection of frame synchronization over a predetermined frame synchronization protection time period when the frame synchronizing signal is not detected at the proper timing, a circuit for measuring the S-N ratio of the supplied signal, and a circuit for changing the length of the frame synchronization protection time period according to the measured result.

Thus, the main advantage of the present invention is that the frame synchronization protection time period is not fixed to a constant time period, but to a relatively long time period when a broadcasting signal is applied, and to a relatively short time period when a non-broadcasting signal is applied, to prevent the situation of frequent muting of the sound output due to degradation in the S-N ratio while receiving broadcast MUSE signal, and to ensure noise muting of a sound signal due to dropout and special reproduction while non-broadcast signal is applied.

Another advantage of the present invention is that the frame synchronization protection time period is not fixed to a constant time period, but changes to a relatively long time period when the S-N ratio of the input signal degrades, and to a relatively short time period when the S-N ratio of the input signal is sufficient to prevent the frequent generation of sound output muting otherwise caused by degradation of S-N ratio of the input MUSE signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram schematically showing the arrangement of data blocks of the transmission control codes of a MUSE signal.

FIG. 8 is a diagram showing the contents of the control codes of a MUSE signal.

DESCRIPTION OF THE PREFERRED EMBODIMENTS

Figure 1:
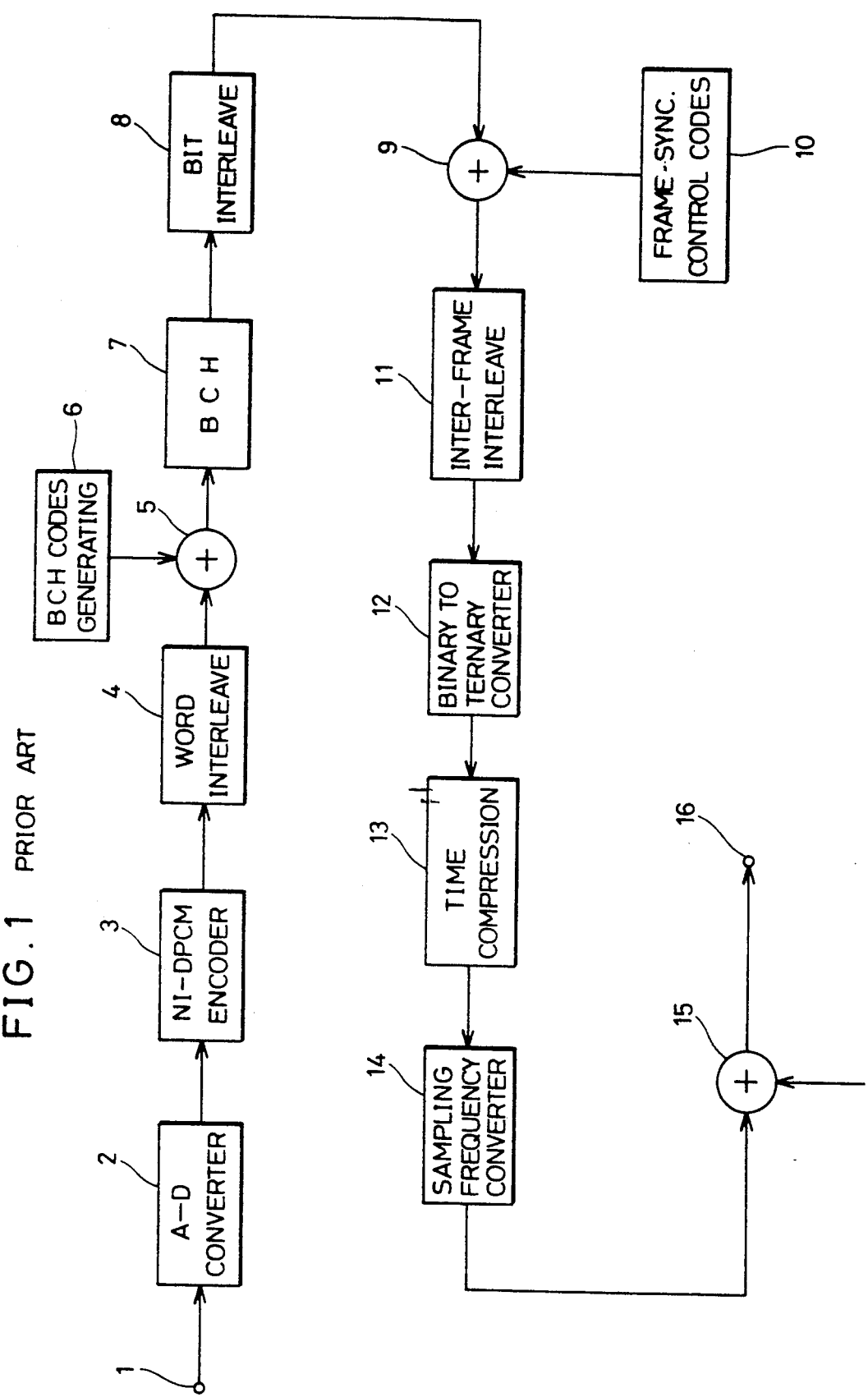
FIG. 1 is a schematic block diagram showing a typical structure of a conventional MUSE sound encoder.
Figure 2:
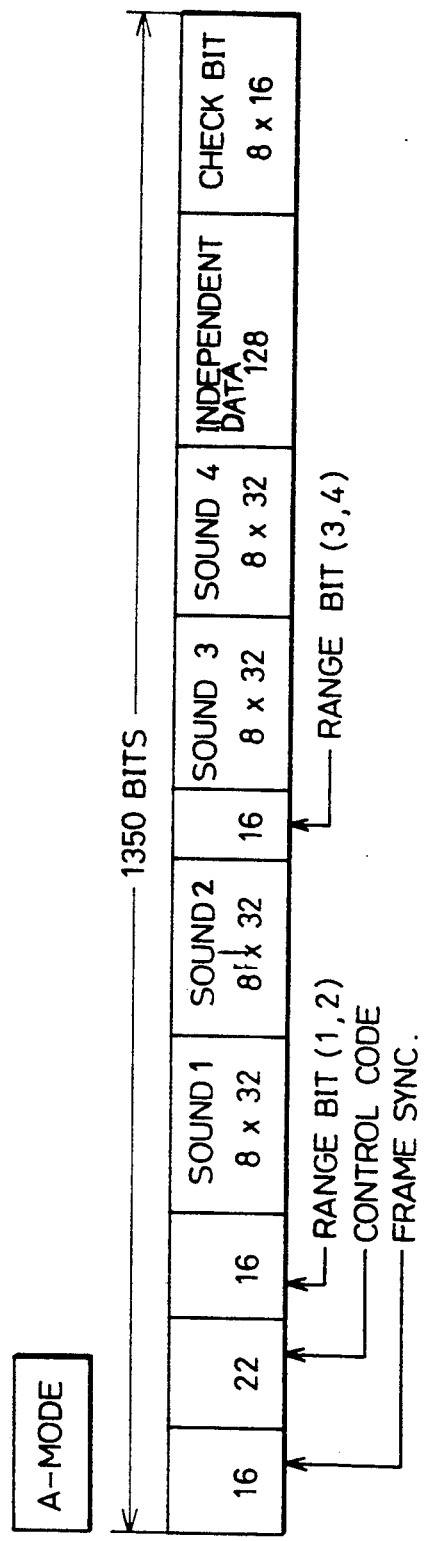
FIG. 2 is a diagram schematically showing the bit arrangement of one frame in A-mode.
Figure 3:
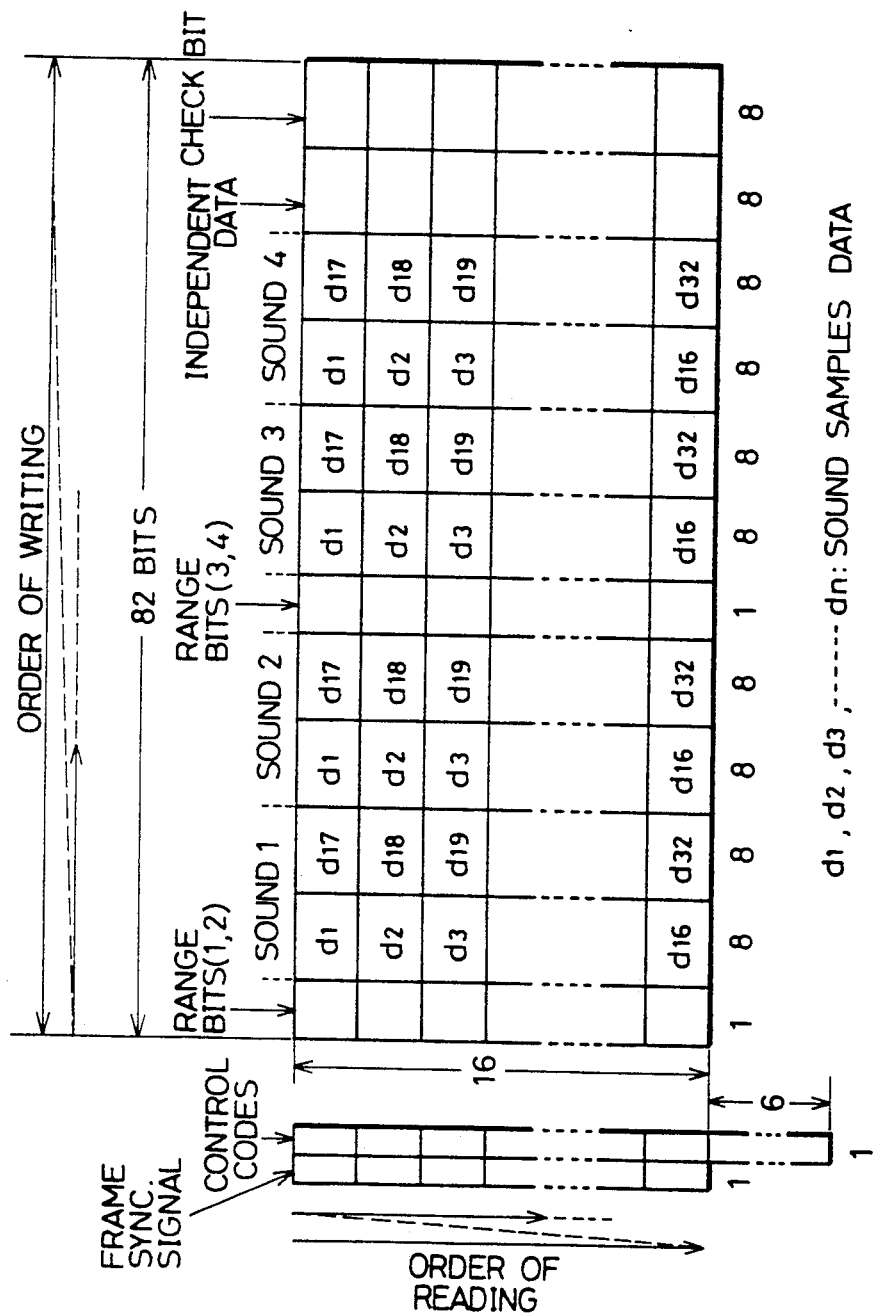
FIG. 3 is a diagram schematically showing the bit allocation on a bit interleave matrix in A-mode.
Figure 4:
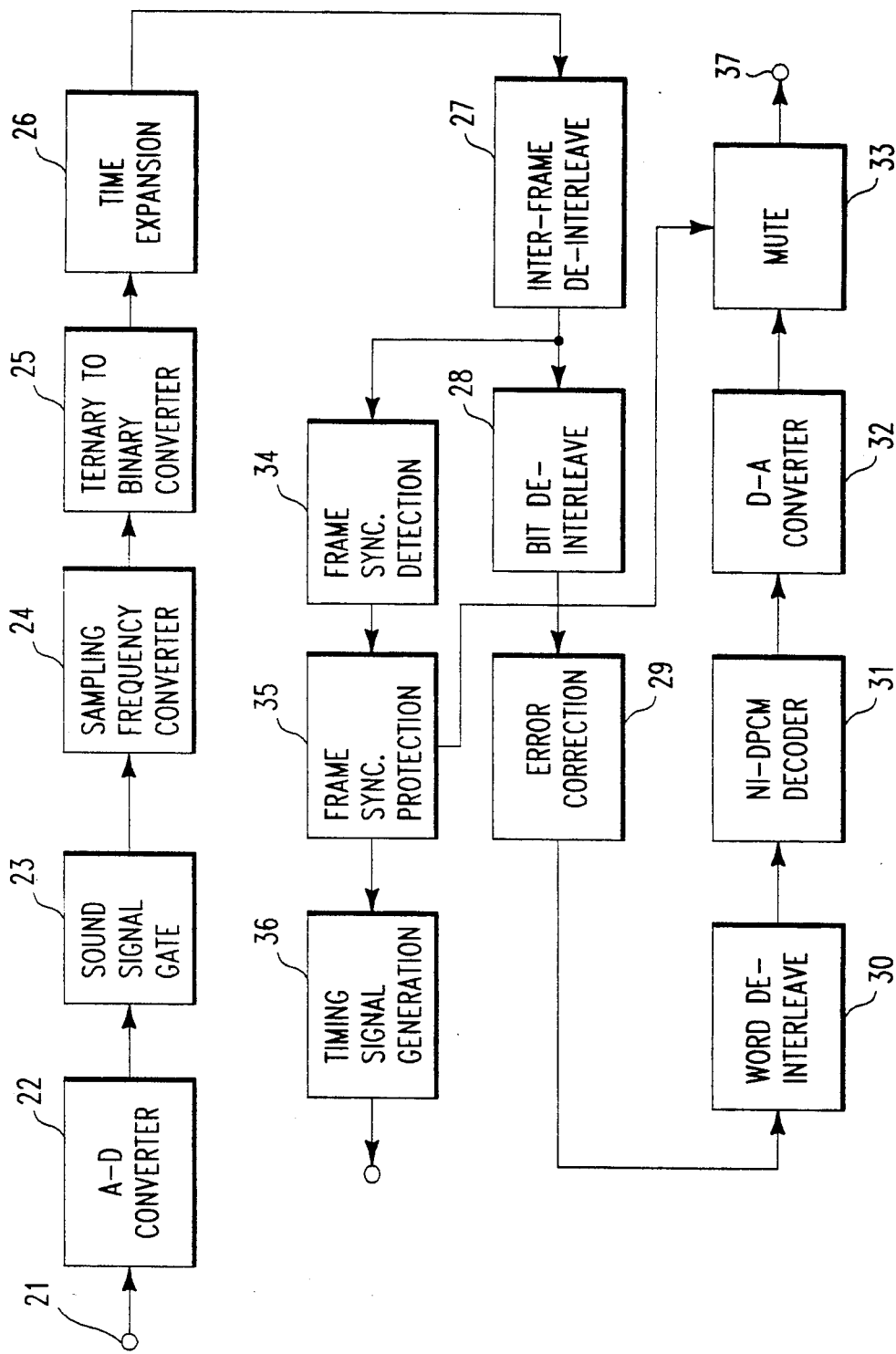
FIG. 4 is a block diagram showing a structure of a conventional MUSE sound decoder.
Figure 5:
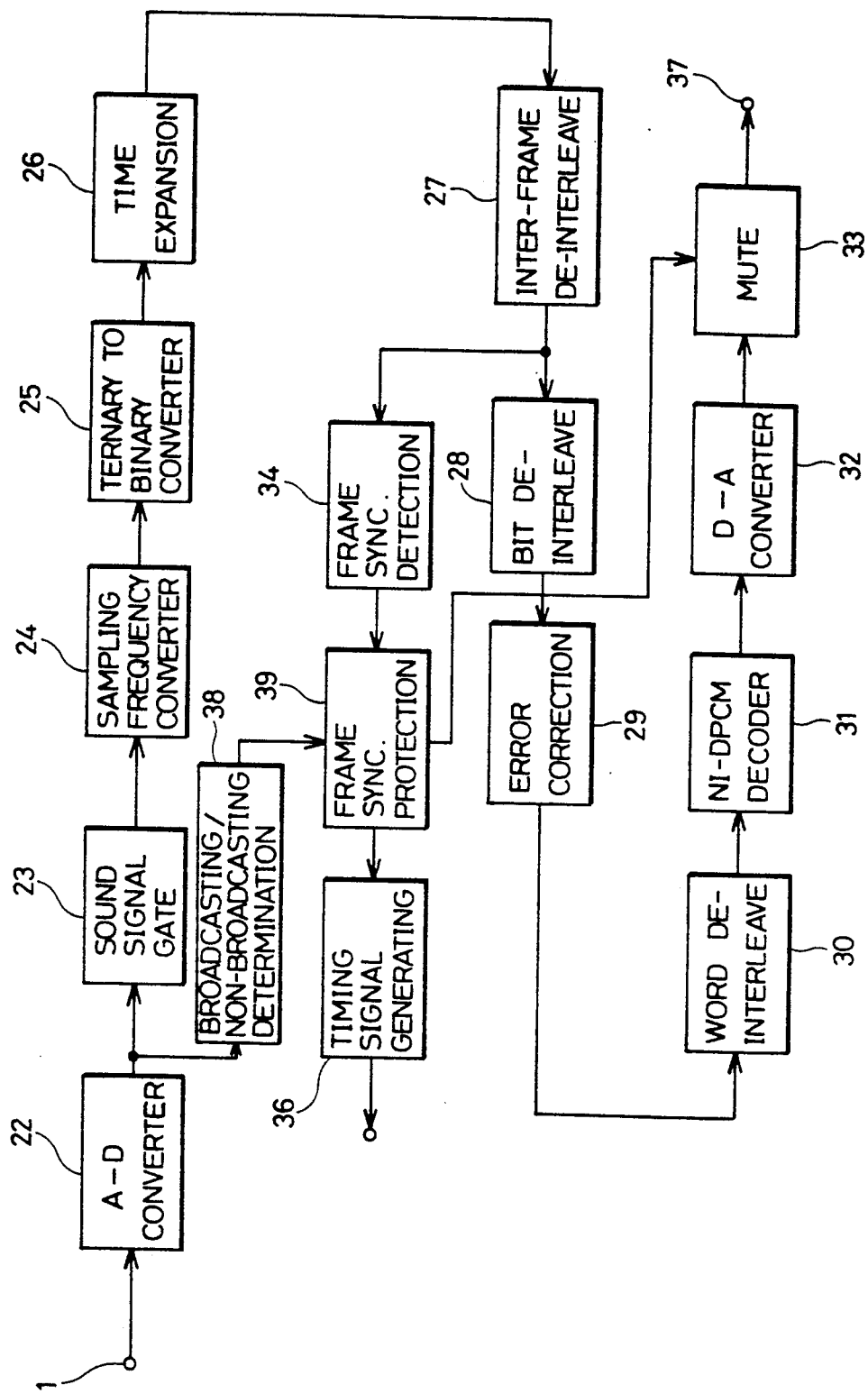
FIG. 5 is a schematic block diagram showing a MUSE sound decoder according to an embodiment of the present invention.

FIG. 5 is a schematic block diagram showing a MUSE sound decoder according to the first embodiment of the present invention. The embodiment of FIG. 5 is similar to that of FIG. 4 showing a conventional MUSE sound decoder except for the points that will be described hereinafter.

A MUSE signal converted into a digital signal by A-D converter 22 is supplied to sound signal gate 23, and also to broadcasting/non-broadcasting determination circuit 38. As will be described in detail afterwards, broadcasting/non-broadcasting determination circuit 38 detects a broadcasting/non-broadcasting identification flag previously included in a MUSE signal for making determination whether the MUSE signal is broadcast or non-broadcast from a reproduction equipment. Broadcasting/non-broadcasting determination circuit 38 generates a determination flag indicating the result to provide the same to frame synchronization protection circuit 38.

As will be described in detail afterwards, frame synchronization protection circuit 39 switches the frame synchronization protection time period according to the determination signal to a relatively long time period of 64 frames when a broadcasting MUSE signal is applied, and to a relatively short time period of 5 frames when a non-broadcasting (reproduced) MUSE signal is applied. The operations other than those described in the above embodiment of FIG. 5 are similar to those of a conventional one shown in FIG. 4, and will not be described here.

Figure 6:
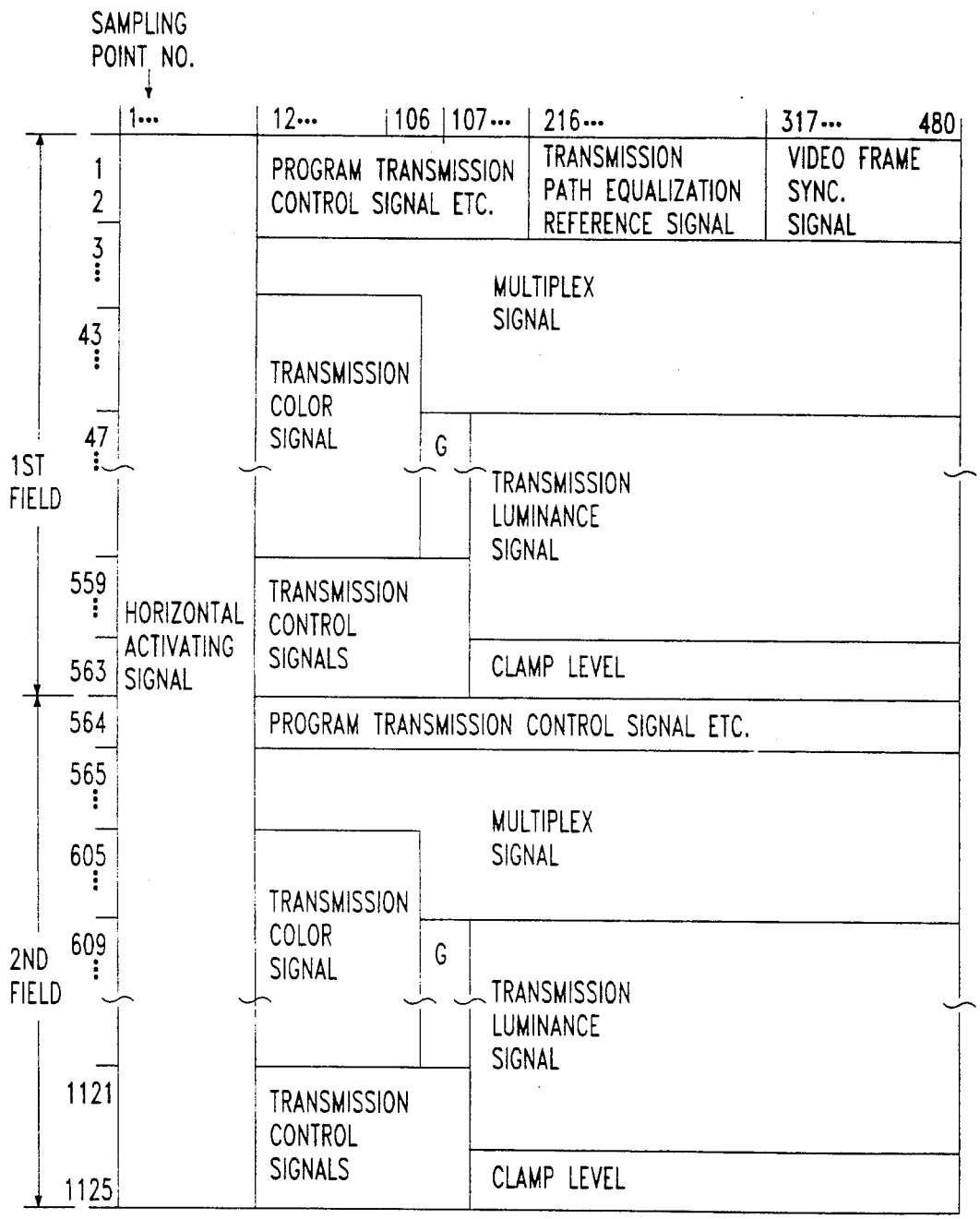
FIG. 6 is a diagram schematically showing the allocation of a signal in 1 frame of a MUSE signal.

FIG. 6 schematically shows the allocation of a MUSE signal within 1 frame (two fields). Referring to FIG. 6, the vertical axis indicates the line numbers (1-1125) of the first and second fields, and the horizontal axis indicates the sampling point number of each line. In the regions of sampling point numbers 12 to 106 of lines 559 to 563 of the first field and lines 1121 to 1125 of the second field, transmission control signals such as those shown in FIG. 7 are included.

Referring to FIG. 7, each transmission control signals includes a group of eight data blocks designated from 1 to 8, and two more groups of a repetition of these blocks. Each block of data includes a Hamming code of four bits and data of four bits, with 2 samples as 1 bit length. This means that the eight data blocks of 1 to 8 include control data totaling $4 \times 8 = 32$ bits regarding the data of following field.

FIG. 8 is a diagram showing the contents of such a control signal of 32 bits. Referring to FIG. 8, a broadcasting/non-broadcasting identification signal is inserted in the 19th bit of the control signal of 32 bits. It is assumed that code "1" is previously set as the identification signal flag at the transmission side in the case of a MUSE signal transmitted by broadcasting radio wave, and code "0" is previously set as the identification signal bit at the recording side in the case of a MUSE signal reproduced from a medium such as an optical disk. The broadcasting/non-broadcasting determination circuit 38 of FIG. 5 detects the identification signal in the 19th bit of the control signals, i.e. the flag in the third bit of the 5th block out of the eight data blocks each of 4 bits, for making determination whether the received MUSE signal is a broadcasted signal or a non-broadcasted signal to generate a determination signal indicating the result.

Figure 9:
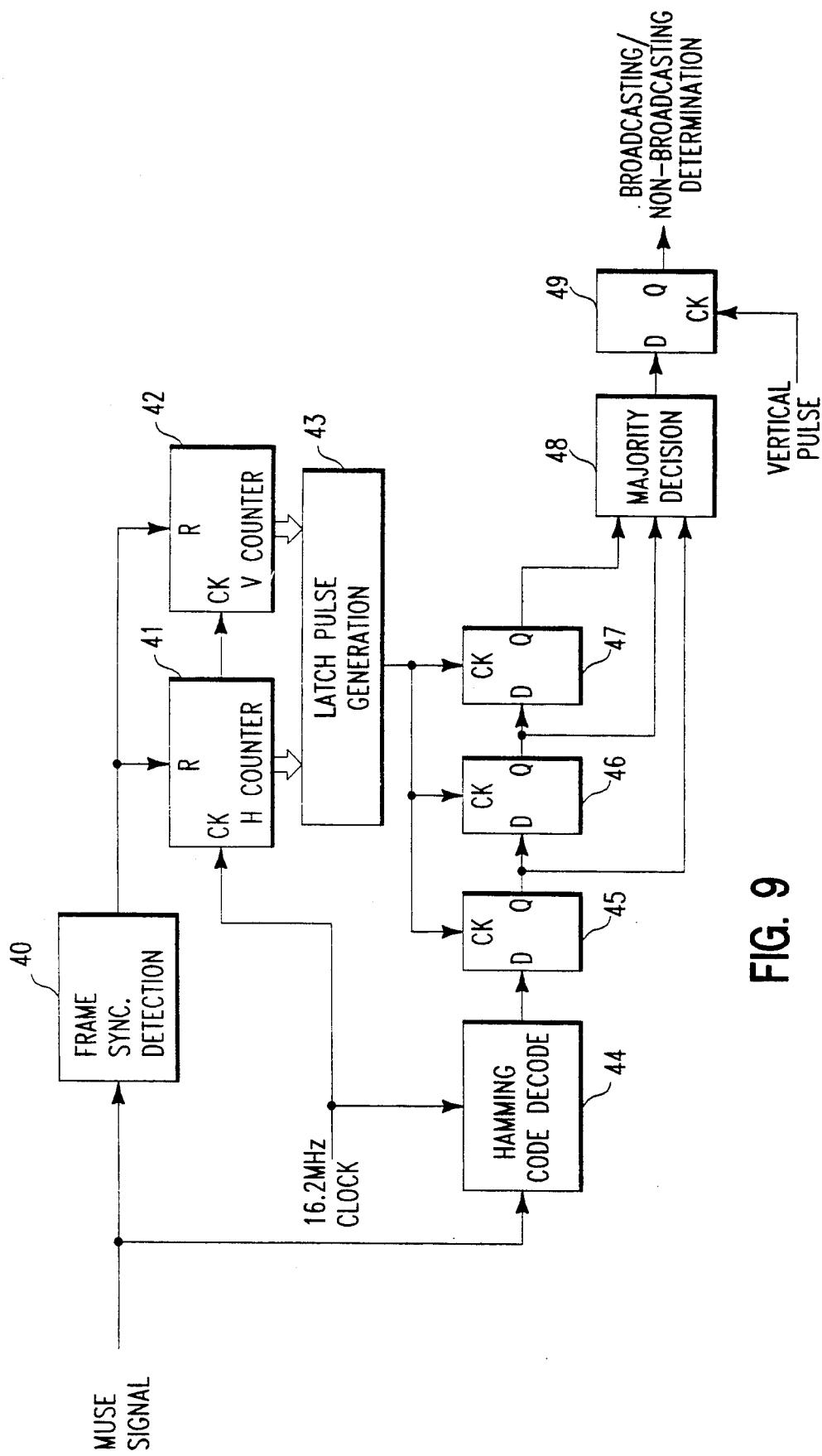
FIG. 9 is a block diagram showing the broadcasting/non-broadcasting determination circuit of FIG. 5.

FIG. 9 is a block diagram showing the structure of such a broadcasting/non-broadcasting determination circuit 38. Referring to FIG. 9, the digital MUSE signal from A-D converter 22 of FIG. 5 is supplied to frame synchronization pulse detection circuit 40 and to a Hamming code decoding circuit 44. Frame synchronization pulse detection circuit 40 detects the frame synchronization pulse of the MUSE video signal (included in the first and second lines of the MUSE signal of FIG. 6), according to the signal of the parallel 8-bit output signal of A-D converter 22 to provide the detection output.

A horizontal counter 41 is reset by the detection output and counts the sampling clock pulses (CK) of 16.2 MHz. A vertical counter 42 is reset by the detection output of detection circuit 40 and counts the horizontal pulses provided from horizontal counter 41. The outputs of counters 41 and 42 are provided to a latch pulse generating circuit 43, where a pulse for latching a broadcasting/non-broadcasting identification flag is generated according to the counter outputs.

Hamming code decoding circuit 44 decodes the control signal of Hamming code format shown in FIG. 7 in the supplied digital MUSE signal to provide the same to cascade-connected D flip-flops 45, 46 and 47. These D flip-flops sequentially latch the broadcasting/non-broadcasting identification flag in the above described decoded control signal by a latch pulse from the aforementioned latch pulse generating circuit 43.

The data latched in D flip-flops 45-47 are simultaneously supplied to a majority decision circuit 48. The output thereof is latched in a D flip-flop 49 by the vertical pulse of the field period. The output of D flip-flop 49 is supplied to frame synchronization protection circuit 39 of FIG. 5 as the broadcasting/non-broadcasting determination output.

Since the broadcasting/non-broadcasting identification flag is allocated at the 19th bit of the 32-bit control signals, i.e. the third bit of the fifth block of data, determination can be made whether the MUSE signal is a broadcasted MUSE signal or a non-broadcasted MUSE signal by detecting each third data of each 5th block of the three groups each having eight data blocks of 1-8 (FIG. 7) from the reproduced control signal having error correction applied by the Hamming code decoding circuit 44.

The processing time period is constant for the above described Hamming code decoding circuit 44. Therefore, the time period from the head bit of a block in the control signal entering circuit 44 to a bit in that block being provided therefrom is determined in one-to-one correspondence. The entry timing of the head bit of each fifth block in the control signal to decoding circuit 44 is detected by the aforementioned counters 41 and 42 so that a latch pulse is generated after a predetermined time period by a latch pulse generating circuit 43 at a timing corresponding to the output of the third bit data in the fifth data block from decoding circuit 44, whereby the three broadcasting/non-broadcasting identification flags included in the control signal are latched in D flip-flops 45, 46 and 47 respectively.

The three broadcasting/non-broadcasting identification flags latched in these D flip-flops are supplied to majority decision circuit 48, whereby the code of "1" or "0" corresponding to at least two latched data of the same value is output and latched over the time period of 1 field in the next D flip-flop 49. The output of D flip-flop 49 is provided to frame synchronization protection circuit 39 of FIG. 5 as the broadcasting/non-broadcasting determination output.

Figure 10:
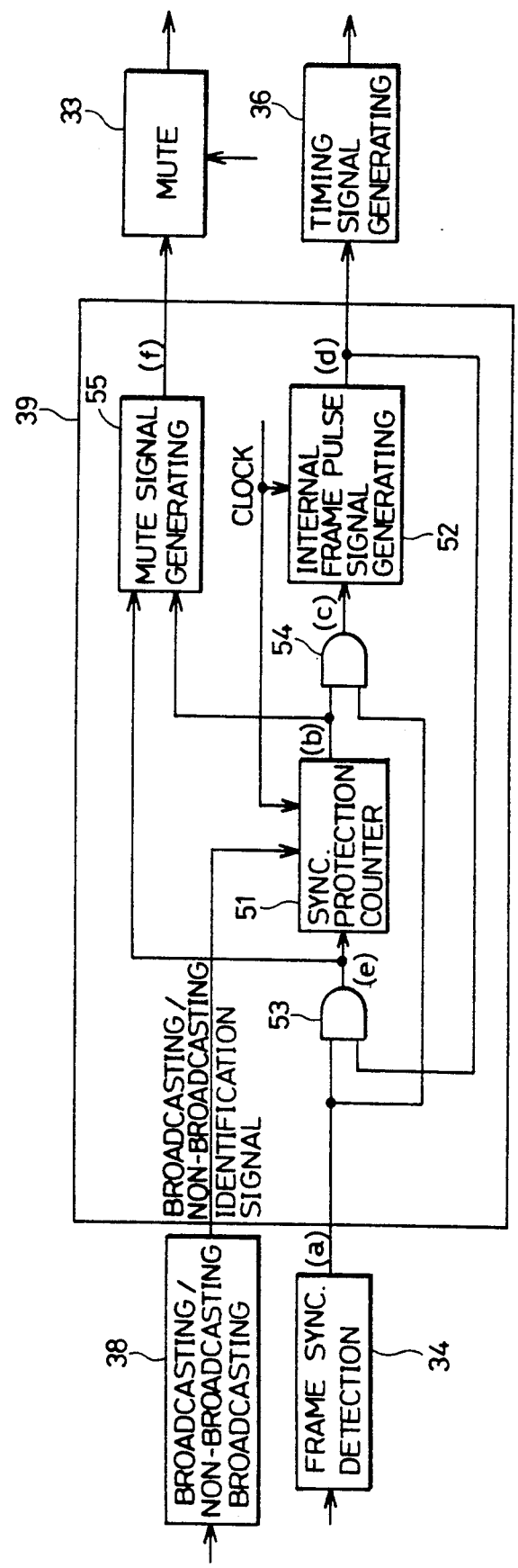
FIG. 10 is a block diagram showing the frame synchronization protection circuit of FIG. 5.
Figure 11:
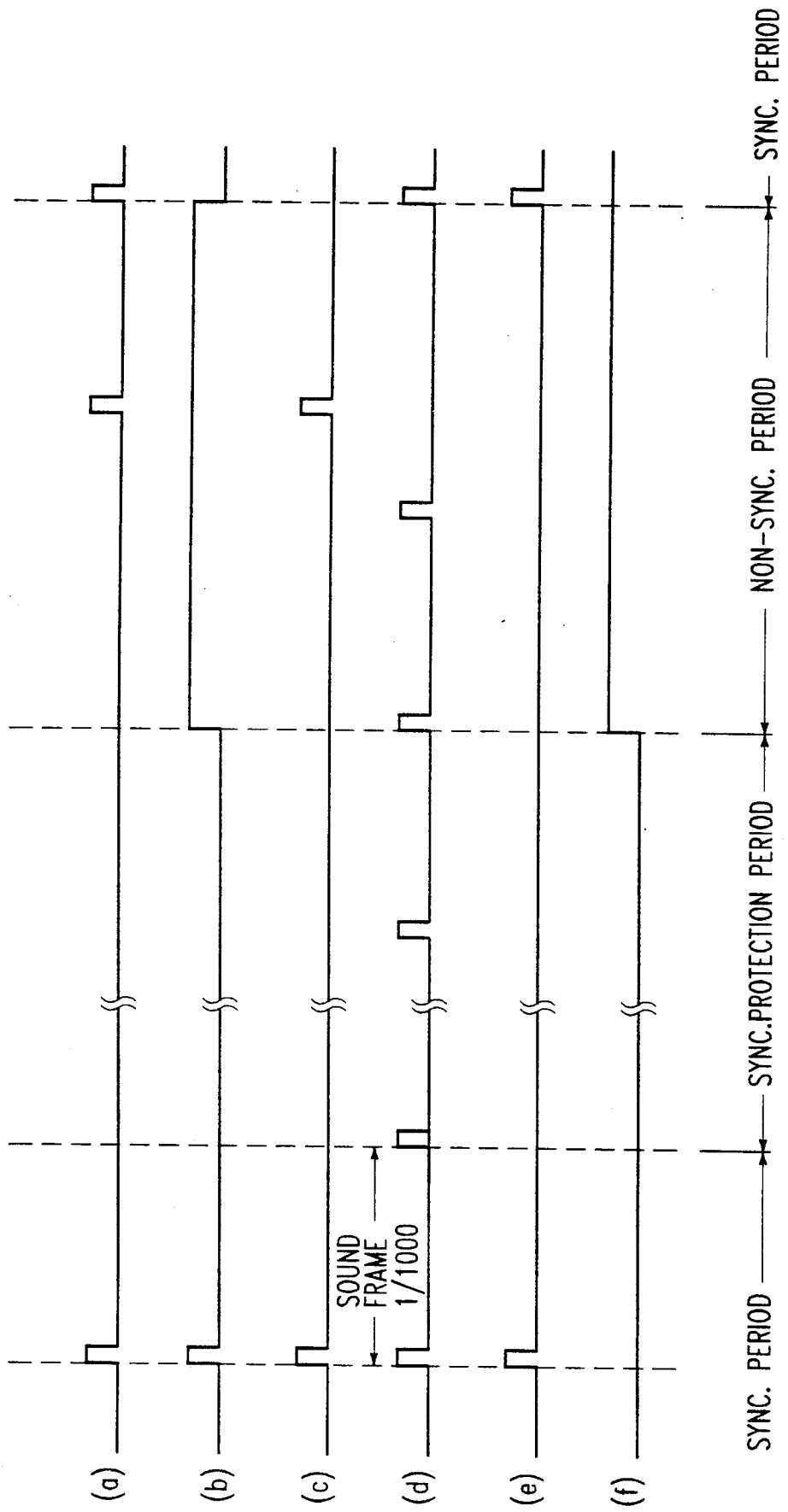
FIG. 11 is a timing chart for describing the operation of the circuit of FIG. 10.

FIG. 10 is a block diagram showing the structure of frame synchronization protection circuit 39 of FIG. 5, and FIG. 11 is a timing chart for describing the operation thereof.

Referring to FIGS. 10 and 11, the frame synchronization detection signal (waveform (a) in FIG. 11) provided from frame synchronization detection circuit 34 is supplied to the respective one inputs of AND gates 53 and 54 in frame synchronization protection circuit 39. The letters in parenthesis, e.g. (a), in FIG. 10 show the circuit locations of corresponding signals in FIG. 11. The other input of AND gate 53 is supplied with the output of an internal frame signal generating circuit 52 that will be described below.

The output of AND gate 53 (waveform (e) in FIG. 11) is applied to the reset input of synchronization protection counter 51, that switches to have a counter length of 64 frames at the time of broadcasted MUSE signal reception and a counter length of 5 frames at the time of non-broadcasted (reproduced) MUSE signal reception according to the identification signal from broadcasting/non-broadcasting determination circuit 38, and also to one input of mute signal generating circuit 55. The output of synchronization protection counter 51 (waveform (b) shown in FIG. 11) is applied to the other input of AND gate 54 and to the other input of mute signal generating circuit 55. Mute signal generating circuit 55 generates a mute signal (waveform (f) shown in FIG. 11) according to these inputs to provide the mute signal to mute circuit 33.

The output of AND gate 54 (waveform (c) shown in FIG. 11) is applied to the reset input of internal frame signal generating circuit 52 formed of a 1350-nary counter. The output of internal frame signal generating circuit 52 waveform (d) shown in FIG. 11) is supplied to the other input of AND gate 53 and to timing signal generating circuit 36 as an internal frame signal.

The operation of frame synchronization protection circuit 39 of FIG. 10 will now be described specifically, the detected frame synchronization pulse (a) from frame synchronization detection circuit 34 and the output (d) of internal frame signal generating circuit 52 that is a 1350-nary counter are provided to AND gate 53, whereby synchronization protection counter 51 remains reset by the matching output (e) of AND gate 53 so that no output is generated (b) from synchronization protection counter 51 while the timing of the inputs of AND gate 53 are matched, i.e. during the synchronization time period where a frame synchronizing pattern in the sound signal is detected as being stable. During this situation, AND gate 54 is closed so that the detected frame synchronization pulse from frame synchronization detection circuit 34 can not pass through gate 54 (c) and internal frame pulse generating circuit 52 is not externally reset.

As a result, internal frame pulse generating circuit 52 formed of a 1350-nary counter provides a counter output every time 1350 bits are counted and then is reset (d) by itself. Because output is not generated from synchronization protection counter 51, as described above, mute signal generating circuit 55 does not generate a mute signal during this time period.

When the frame synchronizing pattern is not correctly detected due to some cause, AND gate 53 is closed so that synchronization protection counter 51 is reset and counts up for every 1 frame. Since synchronization protection counter 51 is set to a counter length of 64 frames by the above-described broadcasting/non-broadcasting determination signal when the applied MUSE signal is a broadcasted signal, the counting of synchronization protection counter 51 continues until 64 frames are counted. During this synchronization protection time period, internal frame signal generating circuit 52 is reset by an internal reset signal to ensure the provision of a frame synchronizing signal, similarly as to the above described synchronization time period.

When synchronization protection counter 51 counts 64 frames, counter output (b) is provided to open AND gate 54. When a proper detected frame synchronization pulse is provided from frame synchronization detection circuit 34 during this non-synchronous time period, internal frame signal generating circuit 52 is externally reset in response to this signal to generate an internal frame signal of the proper phase thereafter, whereby the match of the detected frame synchronization pulse and the internal frame pulse is again detected in AND gate 53.

The counter output (b), generated after 64 frames are counted by synchronization protection counter 51, is supplied to mute pattern generating circuit 55 where a mute signal is generated in response thereto. If a proper frame synchronizing signal is detected and the timing of the two inputs of AND gate 53 match each other again, mute signal generating circuit 55 halts the generation of a mute signal in response to the matching output.

Since synchronization protection counter 51 is set to a counter length of 5 frames by the aforementioned broadcasting/non-broadcasting determination signal, synchronization protection counter 51 counts up to 5 frames when the frame synchronizing signal is not detected due to some cause at the time of non-broadcasting MUSE signal reception. The operation in the case of a non-broadcasted MUSE signal is identical to that of the above-described broadcasting MUSE signal except for the operation counting up to 5 frames instead of 64 frames for a broadcasted MUSE signal, and the description thereof will not be repeated.

According to the first embodiment of the present invention, the frame synchronization protection time period is not fixed to a constant time period, but switched to a relatively long time period when a broadcasted MUSE signal is applied, and to a relatively short time period when a non-broadcasted MUSE signal is applied, to prevent the situation of frequent sound output muting caused by S-N ratio degradation at the time of broadcasted MUSE signal input, and to ensure muting of noise of a sound signal caused by dropout or special reproduction at the time of non-broadcasted MUSE signal input.

Figure 12:
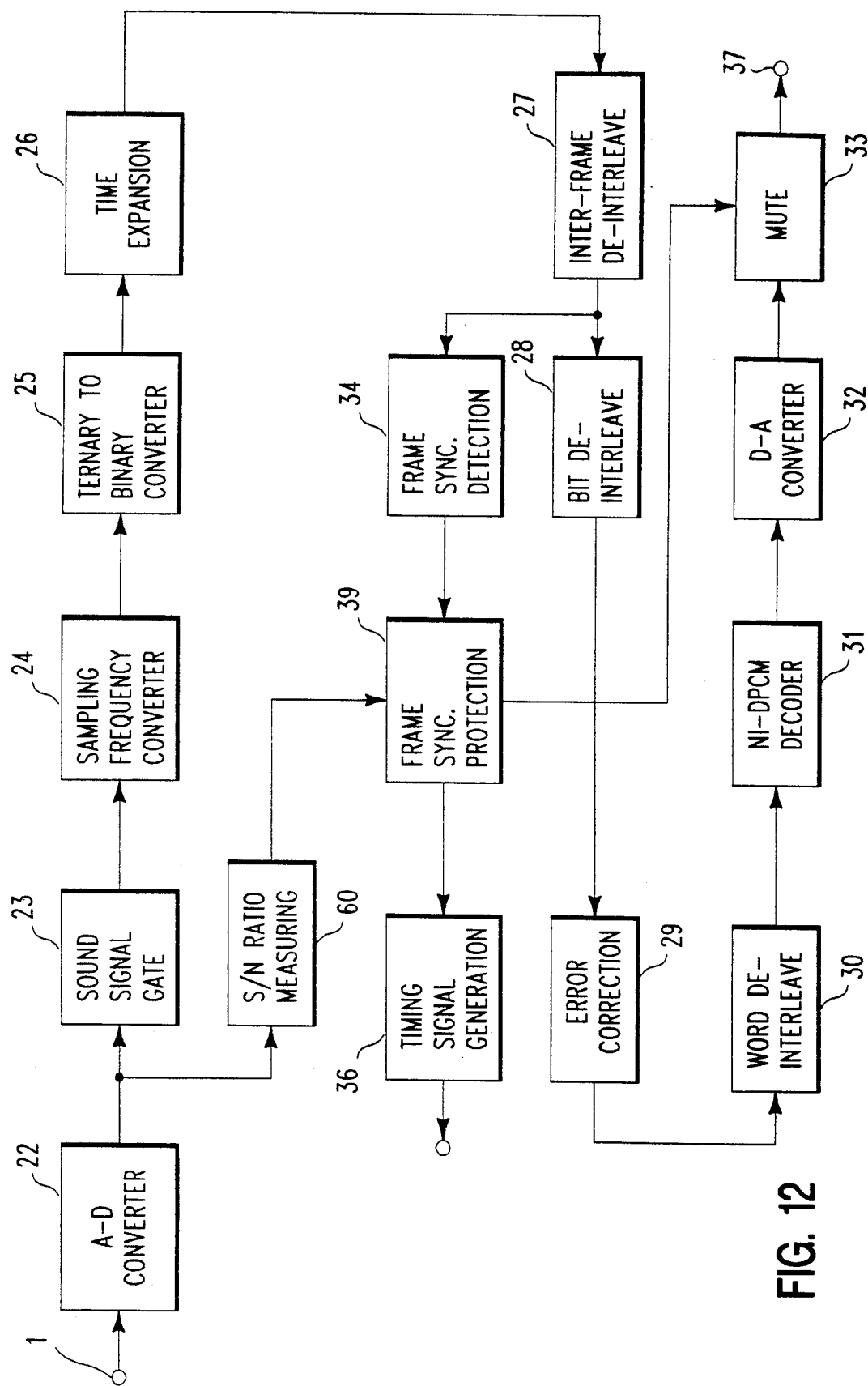
FIG. 12 is a schematic block diagram of a MUSE sound decoder according to a second embodiment of the present invention.

FIG. 12 is a schematic block diagram showing a MUSE sound decoder according to a second embodiment of the present invention. The second embodiment of FIG. 12 is similar to that of FIG. 5 except that S-N ratio measuring circuit 60 is provided instead of the broadcasting/non-broadcasting determination circuit 38 of FIG. 5.

More specifically, the second embodiment is implemented to increase the frame synchronization protection time period in the case of a low S-N ratio of the applied MUSE signal in the broadcasting radiowave reception state.

Referring to FIG. 12, S-N ratio measuring circuit 60 is a circuit to integrate noise components of a digital MUSE signal, provided from A-D converter 22, for detecting the S-N ratio. The details thereof is described in Japanese Patent Laying-Open No. 62-272673.

Figure 13A:
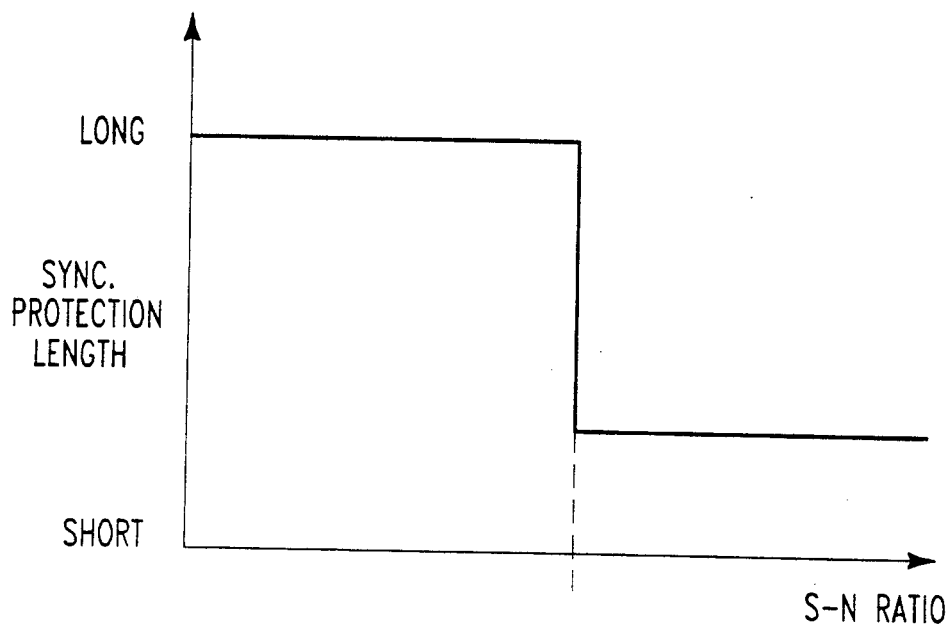
FIGS. 13(a) and 13(b) are graphs for explaining the operation of the embodiment of FIG. 12.
Figure 13B:
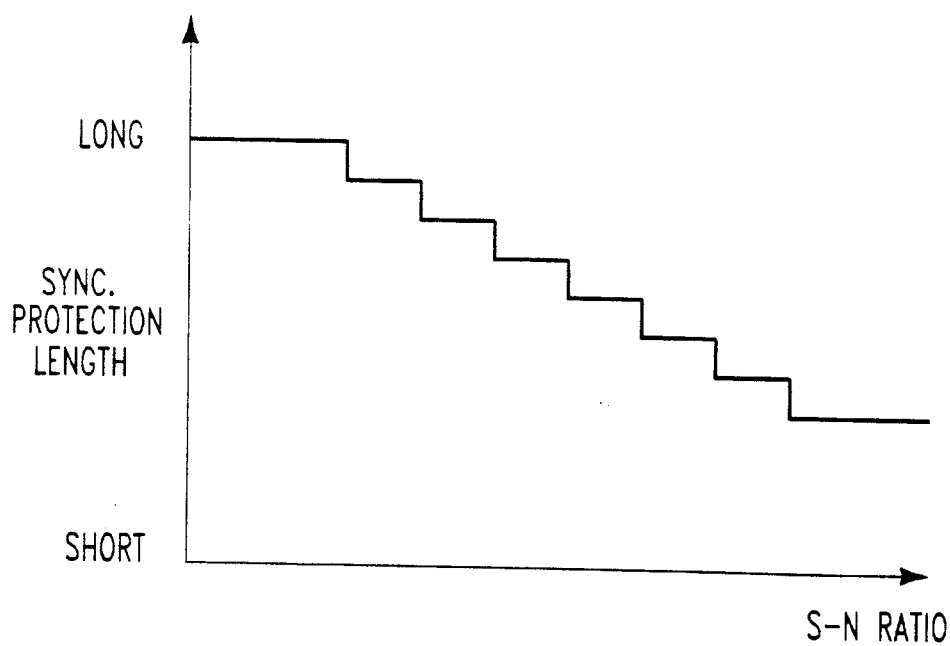

Frame synchronization protection circuit 39 changes the frame synchronization protection time period according to the measured value provided from S-N ratio measuring circuit 60. More specifically, the frame synchronization protection time period is set to, for example, 64 frames in order to prevent frequent muting of a sound signal caused by missing frame synchronization pattern and the like when the measured S-N ratio is lower than a threshold value, and set to, for example, 5 frames in order to reduce noise induced by missing sound data due to dropout or special reproduction of a non-broadcasted MUSE signal when the measured S-N ratio is higher than the threshold value, as shown in FIG. 13(a). A similar effect can be obtained by switching, in stages, the frame synchronization protection time period to a long time period when S-N ratio is low, and to a short time period when S-N ratio is high according to the measured S-N ratio, as shown in FIG. 13(b).

According to the second embodiment of the present invention, the S-N ratio of the received MUSE signal is measured for changing the frame synchronization protection time period according to the measured value to carry out appropriate muting of sound output, conforming to the applied MUSE signal state.

In the above described embodiments, the description is given on the MUSE sound decoder to which the present invention is applied. However, the present invention can be also applied to sound decoders of other transmission systems such as MAC (Multiplexed Analog Component) system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound decoder comprising:
   means for selectively supplying a broadcast signal or a non-broadcast signal so as to provide a supplied signal;
   means, responsive to said supplied signal, for extracting and decoding a sound signal having a frame synchronizing pattern from said supplied signal;
   means for detecting said frame synchronizing pattern in said sound signal so as to form a detection result;
   means, operative in response to the detection result, for generating a frame synchronization signal at a proper timing and during a frame synchronization protection time period whenever the detected frame synchronizing pattern does not occur at the proper timing;
   means, responsive to said supplied signal, for determining whether said supplied signal is a broadcast or a non-broadcast signal and for providing a determination result thereto, wherein the non-broadcast signal is a signal reproduced from a recording medium; and
   means for changing the length of said frame synchronization time period according to the determination result provided by said determining means.

2. The sound decoder according to claim 1, wherein said frame synchronization protection time period length changing means sets said frame synchronization protection time period to a first time period when a determination is made that said supplied signal is a broadcast signal, and sets said frame synchronization protection time period to a second time period when a determination is made that said supplied signal is a non-broadcast signal; wherein said second time period is shorter than said first time period.

3. The sound decoder according to claim 2, further comprising means, responsive to said frame synchronization signal generating means and connected to an output of said extracting and decoding means for muting said sound signal when said frame synchronizing pattern is not restored to the proper timing within said frame synchronization protection time period.

4. The sound decoder according to claim 3, wherein said muting means halts muting of said sound signal when the detected frame synchronizing pattern is restored to the proper timing after the lapse of said frame synchronization protection time period.

5. The sound decoder according to claim 2, wherein said frame synchronization protection means protects frame synchronization by generating an internal frame pulse during said frame synchronization protection time period.

6. The sound decoder according to claim 1, wherein said determining means comprises means for determining whether said supplied signal is a broadcast signal or a non-broadcast signal in response to a broadcasting/non-broadcasting identification signal included in control codes in said supplied signal.

7. A sound decoder comprising:
   means for supplying a received signal so as to provide a supplied signal;
   means, responsive to said supplied signal, for extracting and decoding a sound signal having a frame synchronizing pattern from said supplied signal;
   means for detecting said fame synchronizing pattern in said sound signal so as to form a detection result;
   means, operative in response to said detection result, for generating a frame synchronization signal at a proper timing and during a frame synchronization protection time period whenever the detected frame synchronizing pattern does not occur at the proper timing;
   means for measuring a signal-to-noise ratio of said supplied signal so as to provide a resultant measure; and
   means for changing the length of said frame synchronization protection time period in response to the resultant measure provided by said measuring means.

* * * * *